(12) United States Patent
Kumar

(10) Patent No.: US 10,881,099 B2
(45) Date of Patent: Jan. 5, 2021

(54) PROCESS TO IMPROVE CROP YIELD

(71) Applicant: DSM IP Assets B.V., Heerlen (NL)

(72) Inventor: Manoj Kumar, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/316,637

(22) PCT Filed: Jul. 6, 2017

(86) PCT No.: PCT/EP2017/066906
§ 371 (c)(1),
(2) Date: Jan. 10, 2019

(87) PCT Pub. No.: WO2018/011046
PCT Pub. Date: Jan. 18, 2018

(65) Prior Publication Data
US 2019/0307119 A1    Oct. 10, 2019

Related U.S. Application Data

(60) Provisional application No. 62/361,606, filed on Jul. 13, 2016.

(30) Foreign Application Priority Data

Aug. 15, 2016   (EP) .................................... 16184178

(51) Int. Cl.
*A01N 25/02* (2006.01)
*A01N 43/90* (2006.01)

(52) U.S. Cl.
CPC ............. *A01N 25/02* (2013.01); *A01N 43/90* (2013.01)

(58) Field of Classification Search
CPC .................................. A01N 25/02; A01N 43/90
See application file for complete search history.

(56) References Cited

U.S. PATENT DOCUMENTS

| | | | |
|---|---|---|---|
| 7,727,966 B2 | 6/2010 | De Haan et al. | |
| 8,420,609 B2 | 4/2013 | De Haan et al. | |
| 9,096,633 B2 | 8/2015 | De Haan et al. | |
| 9,295,190 B2 | 3/2016 | Schreurs et al. | |
| 9,615,581 B2 | 4/2017 | De Haan et al. | |
| 2008/0139487 A1* | 6/2008 | Haan | A23G 9/366 514/28 |
| 2014/0148336 A1* | 5/2014 | Guilhabert-Goya | A01N 43/04 504/100 |
| 2015/0157021 A1* | 6/2015 | Stark | A01N 43/90 514/31 |
| 2016/0100586 A1 | 4/2016 | Donners et al. | |
| 2016/0128336 A1 | 5/2016 | Donners et al. | |

FOREIGN PATENT DOCUMENTS

| | | |
|---|---|---|
| CN | 103833476 A | 6/2014 |
| CN | 104130059 A | 11/2014 |
| CN | 104273131 A | 1/2015 |
| CN | 104718849 A | 6/2015 |
| CN | 104829395 A | 8/2015 |
| WO | 2006/045831 A1 | 5/2006 |
| WO | 2013/092995 A1 | 6/2013 |
| WO | 2014/085565 A1 | 6/2014 |
| WO | 2014/191449 A1 | 12/2014 |
| WO | 2014/191450 A1 | 12/2014 |
| WO | 2015/034359 A2 | 3/2015 |

OTHER PUBLICATIONS

PCT International Search Report for PCT/EP2017/066906, dated Aug. 18, 2017.

* cited by examiner

*Primary Examiner* — Zohreh A Fay

(74) *Attorney, Agent, or Firm* — McBee Moore & Vanik IP, LLC

(57) ABSTRACT

The present invention relates to a process to improve the yield of strawberry crops, the process comprising the step of applying a polyene antifungal agent, especially natamycin, to the roots of a strawberry plant prior to planting said plant and/or to the medium to which the plant is to be planted. The claimed process results in an increased number of crop, an increase in the weight of individual crop, and an increase in the total weight of the crop, and may allow for an earlier harvest.

8 Claims, No Drawings

PROCESS TO IMPROVE CROP YIELD

CROSS-REFERENCE TO RELATED APPLICATIONS

This application is a National Stage entry of International Application No. PCT/EP2017/066906, filed Jul. 6, 2017, which claims priority to U.S. Provisional Patent Application No. 62/361,606, filed Jul. 13, 2016, and European Patent Application No. 16184178.8, filed Aug. 15, 2016.

BACKGROUND

Field

FIELD OF THE INVENTION

The present invention relates to a process to improve the yield of strawberry crops.

Description of Related Art

In agriculture crops of many varieties such as legumes, fruits, lettuce, wheat, barley, corn, and rice are produced. Many of these crops are susceptible to damage by plant pathogens including fungi, bacteria, viruses, and nematodes and are vulnerable to insects, birds, rodents, and other organisms that rely on them as a food source. Fungi are one of the most economically important groups of plant pathogens and are responsible for huge annual losses of marketable food, fiber, and feed.

Traditionally, crop yield is increased by pruning or using fertilizers. Also, the state of the art discloses genetically modified plants that have higher fruit yield, such as tomato (WO 2015/1360650). In addition, treatment with agents is disclosed. CN 104130059(A) describes a plant-growth regulating agent Huaguoling capable of promoting yield increase of melon and fruit. CN 104718849(A) describes a process for improving the yield of tsaoko amomum fruit by spraying a sucrose solution, such that pollinating insects are attracted. CN 104273131(A) describes the use of tetrahydropyrimidine and hydroxy tetrahydropyrimidine to promote production of melons and other fruits.

Strawberries are a widely-grown fruit belonging to the genus *Fragaria*. It is grown on most continents and is appreciated for its distinctive fragrance, bright red color, and sweetness. It can be consumed fresh, as jam, ice creams, milkshakes, and in many other products. The yield of strawberry varies widely, depending on the cultivar, season of growth, and latitude, and numbers of 12,000 to 25,000 lbs./acre are reported. CN 104829395 discloses using a fertilizer based on decomposed chicken dung, plant ash, canal mud older than 3 years, rape seed cake, urea, *Gentiana scabra* Bge, mint, *capsicum*, Chinese honey locust, and a water-retaining agent, which can increase strawberry yield. CN 103833476 discloses a fertilizer comprising microbial flora, a humic acid, a nitrogen fertilizer, a phosphatic fertilizer, a potash fertilizer, a boric acid, an insecticide, and water-soluble parting agent which increases the yield of strawberries.

Anthracnose is a strawberry disease affecting all parts of the plant including fruit, crowns, leaves, petioles, and runners. Three related species, *Colletotrichum acutatum, Colletotrichum gloeosporioides*, and *Colletotrichum fragariae* are associated with anthracnose worldwide. All strawberry cultivars can be affected but some such as cv. Albion, cv. Camarosa, cv. Chandler, and cv. Portola are especially susceptible to anthracnose. The disease can increase during wet years or with over-irrigation. If plants are infected in the nursery, the disease can reach epidemic proportions during the establishment of commercial grower fields for fruit production when foliar sprinklers are used in addition to drip tape irrigation under plastic mulch. The pathogen can survive in infected plants and plant tissues in soil for at least nine months in the absence of host plants. In addition to strawberry, several weeds are known to host the pathogen including chickweed, fiddleneck, and vetch. If strawberries pre-plant nursery stocks are planted in infested soil, they become infected when they come in contact with soil containing fungal spores. Conidia are not airborne but are splashed onto crowns, stems, or fruit by rain or irrigation water. In fields that have been fumigated, the disease usually originates on infected nursery stock or from volunteer strawberry plants in adjacent fields. In addition, inoculum can come from contaminated soil on field equipment. The disease will develop quickly following periods of warm, rainy weather. Under unfavorable conditions, early infections may become quiescent and be activated once conditions are conducive (i.e., warm, humid weather, rain, or sprinkler irrigation). Crown rots can develop in young plants soon after planting or when warm temperatures occur. When crowns are infected, the entire plant may wilt and die.

Management of anthracnose is difficult when environmental conditions are favorable for disease development and inoculum is present. Soil fumigation (e.g. using methyl bromide) destroys most residual inoculum of the pathogen in the soil but is no longer permitted. In warm, inland fields soil solarization can be effective in destroying soil inoculum. Using drip irrigation and clean planting stock are important components of managing anthracnose. Field equipment should be cleaned before and after use to ensure that contaminated soil and plant parts are not transported into a field or from an infested part of the field to a non-infested section. Crop rotation with a non-host crop can also help in reducing levels of this pathogen in the soil. Also important is good weed management in and around the field to destroy any weeds that may harbor the pathogen. Water or fungicide treatments can be used on transplants before planting in production fields. Running water treatments can wash off most of the soil and may remove inoculum from transplants.

For fungicide treatment, azoxystrobin and a combination of cyprodinil and fludioxonil are presently amongst the treatments of choice. These compounds however have major drawbacks. In the first place they are non-natural, i.e. from a synthetic origin, potentially phytotoxic, and secondly it has been observed that pathogen populations that are resistant to these fungicides unfortunately are present (i.e. in US states of California and Florida). Moreover, the use of synthetic agrochemicals to control plant pathogens has increased costs to farmers and has caused harmful effects on the ecosystem. Consumers and government regulators alike are becoming increasingly concerned with the environmental hazards associated with the production and use of synthetic agrochemicals for protecting nursery stocks and seeds from pathogens. Furthermore, applying agrochemicals is fraught with problems such as bonding of the agrochemicals to the soil and the need for expensive and complex chemical application equipment and worker's safety. In addition, plants can be adversely affected by agrochemicals, as these chemicals can be toxic to seeds and plants that sprout from the seeds. Such toxicity limits the amount of these agrochemicals that can safely be applied.

There is a need to develop improved methods for combatting anthracnose that not only perform at least as well as prior art methods but are in addition safe, environmentally friendly, and free from development of resistance and/or phytotoxicity.

SUMMARY

The invention relates to a process for increasing the yield of strawberry crops, the process comprising the step of applying of a polyene antifungal agent to the roots of a crop-bearing strawberry plant prior to planting said plant and/or to the medium to which the plant is to be planted. The polyene antifungal agent (or polyene fungicide) is preferably part of a composition, preferably a liquid composition, such as an aqueous composition which preferably comprises at least one additional compound selected from the group consisting of surfactants, sticking agents, carriers, adjuvants, solvents, dispersants, emulsifiers, wetting agents, stabilizers, antifoaming agents, buffering agents, and antioxidants. Such liquid composition may comprise between 1-10,000 ppm of the polyene antifungal agent. The polyene antifungal agent may be applied to the roots by dipping the roots in a liquid composition comprising said polyene antifungal agent. The polyene antifungal agent is preferably natamycin, preferably comprising needle shaped crystals having an average length of between 0.1 and 20 μm. The natamycin may comprise at least 90% w/w needle shaped crystals having an average length of between 0.1 and 20 μm. The invention further provides a crop-bearing strawberry plant of which the roots have been treated with a polyene antifungal agent. The invention also provides the use of natamycin to prevent or reduce anthracnose in a strawberry plant.

DETAILED DESCRIPTION OF A PREFERRED EMBODIMENT

Natamycin is registered as a postharvest fungicide of fruit crops (e.g. citrus, stone fruit, pome fruit) in the United States. The compound is classified by the EPA as a biofungicide. This classification includes biological organisms, pesticidal compounds that organisms or plants produce from genetic material added to them, or naturally occurring substances that are non-toxic or less toxic than conventional pesticides. Natamycin is a biofungicide because it is a natural fermentation product of the bacterium *Streptomyces natalensis* and other species of *Streptomyces*. It is part of the reduced risk pesticide classification of the Food Quality Protection Act of 1995. These pesticides are generally safer than other conventional pesticides and help broaden IPM practices and reduce exposure risks to humans, show less toxicity to non-target organisms, and have less environmental impact. Compounds classified as bio-pesticides by the US-EPA are exempt from tolerance in the US, Canada, and Mexico. Natamycin is a broad-spectrum biofungicide that is effective against many fungi within the *Ascomycota* (e.g. *Botrytis* and *Colletotrichum* spp.) and *Zygomycota* (e.g. *Rhizopus stolonifer*) genera that are pathogens of strawberry and has a minimum inhibitory concentration of <10 ppm for most of these organisms.

Interestingly, natamycin has been used in the food industry as a preservative of dairy products (e.g. cheese) and dried meats for over 30 years. During this time, no resistance in target organisms including *Penicillium* spp. has ever been reported. This has rendered natamycin as low risk for resistance development. Natamycin can, amongst others, exist as stable needle-shaped crystals having an average length of 0.1-20 μm, which have the advantage over conventional natamycin suspensions of avoiding problems caused by settling as disclosed in WO 2006/045831.

Following an outbreak of anthracnose in the 2016 and the urgency to evaluate new fungicides a pre-plant dip study for the management of anthracnose of strawberry was conducted. Although the use of natamycin in connection with use in plant pathology methods is known, the application for combatting anthracnose was never mentioned or suggested. WO 2014/085565 discloses a method for controlling fungal pathogens, notably pathogens that cause sudden death syndrome like *Fusarium* spp., by application of a composition comprising a polyene fungicide to the soil in which a plant or seed is to be planted or to plant roots. The polyene fungicide may be applied by soil drenching or direct application to plant roots via immersion/root dipping. Sudden death syndrome and root rot, the problems to be dealt with in this document, are quite different from the typical strawberry disease anthracnose, for which up until to date only chemical fungicides are successfully used. The use of natamycin is also reported in WO 2013/092995 however for a different application, namely to improve and accelerate the germination of seeds, whereby the natamycin can be applied to the seed or to the medium in which the seed is to be planted, e.g. soil in-furrow. WO 2014/191449 and WO 2014/191450 disclose methods for enhancing plant growth and crop yield by application of a natamycin producing bacterial strain to seed, or to the medium in which the seed is to be planted (WO 2014/191449), or to a plant (WO 2014/191450), but again not in relation to anthracnose. WO 2015/034359 discloses an antifungal soil treatment composition for preventing crop losses comprising an antimicrobial compound, especially the polyene fungicide natamycin, and a polyelectrolyte complex. The polyelectrolyte complex dramatically increases the antifungal activity of the natamycin.

The present invention discloses results on strawberry cultivars, such as for example cv. Florida Radiance, cv. Portola and cv. Fronteras. Surprisingly, the natural fermentation product natamycin appeared to be a highly effective pre-plant dip, similar in efficacy to azoxystrobin and a combination of cyprodinil and fludioxonil. Natamycin decreases the incidence and severity of disease, decreases plant mortality, and increases yield as compared to the controls of inoculated and non-inoculated plants, as well as that of several other fungicides evaluated. Additionally, natamycin is very effective when plants are inoculated with azoxystrobin-resistant isolates of the pathogen. Additionally, no phytotoxicity is observed on two plant cultivars when dipped in the fungicide and planted the next day.

In a first aspect, the present invention provides a process for increasing the yield of a strawberry crop, the process comprising the step of applying a polyene antifungal agent to the roots of a crop-bearing strawberry plant prior to planting said strawberry plant. Preferably, the strawberry plant is crop-bearing. In one embodiment, the polyene antifungal is applied the medium to which the plant is to be planted.

In the context of the invention a "crop" is understood to be a cultivated plant that is harvested for food. Examples include sugarcane, pumpkin, maize (corn), wheat, rice, cassava, soybeans, hay, potatoes, eggplants, zucchini, peppers, and cotton.

In an embodiment, the crop-bearing plant is a fruit-bearing plant. In the context of the invention a "fruit" is understood to be the fleshy seed-associated structure of a plant. Fruits usually surround seeds, but are not seeds themselves. Fruits includes apple, apricot, avocado, banana, bilberry, blackberry, blackcurrant, blueberry, boysenberry, currant, cherry, cherimoya, cloudberry, coconut, cranberry, damson, date, dragon fruit, durian, elderberry, feijoa, fig, goji berry, gooseberry, grape raisin, grapefruit, guava, huckleberry, jabuticaba, jackfruit, jambul, jujube, juniper berry, kiwifruit, kumquat, lemon, lime, loquat, longan, lychee, mango, marionberry, melon, cantaloupe, honeydew, watermelon, miracle fruit, mulberry, nectarine, nance, olive, orange, blood orange, clementine, mandarin, tangerine, papaya, passionfruit, peach, pear, persimmon, physalis, plantain, plum, prune (dried plum), pineapple, pomegranate, pomelo, purple mangosteen, quince, raspberry, salmonberry, rambutan, redcurrant, salal berry, salak, satsuma, star fruit, strawberry, tamarillo, tamarind, tomato, and ugli fruit. In an embodiment, the crop-bearing plant is a strawberry plant and the fruit is a strawberry.

In an embodiment, the polyene antifungal agent is part of a composition, preferably a liquid composition, such as an aqueous composition, e.g. an aqueous suspension. Such composition may include concentrated stock suspensions/solutions and concentrated dry products such as e.g. powders, granulates and tablets. In an embodiment, such composition is an aqueous suspension of crystalline natamycin, which crystals are preferably needle-shaped, having a mean length of between 0.1 and 20 μm.

A liquid composition comprising a polyene antifungal agent which is suitable in the process of the invention, e.g. which liquid composition is suitable for applying a polyene antifungal agent to the roots of a crop-bearing plant e.g. by dipping, may comprise between 1 and 200, more preferably between 5 and 50, more preferably between 10 and 30 oz. of a 10% w/v aqueous natamycin suspension per 150 gallons of liquid composition. Preferably, the concentration of the polyene antifungal agent in the liquid composition is from 1-10,000 ppm, more preferably from 10-8,000 ppm, most preferably from 50-5,000 ppm.

In an embodiment, the polyene antifungal agent comprises natamycin, preferably natamycin comprising needle shaped crystals having an average length of between 0.1 and 20 μm, more preferably comprising natamycin comprising at least 90% w/w needle shaped crystals having an average length of between 0.1 and 20 μm. Preferably, the crystals having a needle shaped form have a length of more than 2 μm, more preferably have a length of more than 4 μm, most preferably have a length of more than 6 μm. Preferably, the mean diameter of the needle shaped crystals is between 0.1 and 2 μm, more preferably less than 1.5 μm and most preferably a length of less than 1.0 μm. By "length" and "diameter" is meant the length and diameter as measured with an (Olympus) microscope (type BH-2) with a total used magnification of 1000 times, whereby the length is the largest length size of the crystal and the diameter is the size of the thickness of the crystal measured in the middle of the length and perpendicular to the length direction. The mean length and the mean diameter are both determined by measuring at least 100 crystals.

A composition comprising a polyene antifungal suitable in the process of the invention may also contain at least one other antifungal compounds such as e.g. imazalil (Janssen Pharmaceutica N.V., Belgium), thiabendazole (e.g. the commercial product TECTO® Flowable SC of Syngenta, USA), benomyl, captan (nonsystemic phthalimide fungicide), prochloraz (N-propyl-N-[2-(2,4,6-trichlorophenoxy)ethyl] imidazole-1-carboxamide) and formalin and commercial products known under the name Topsin® M (Cerexagri Inc, active ingredient thiophanate-methyl), Jet-5® (Certis Europe BV, The Netherlands, active ingredients peracetic acid and hydrogen peroxide) and Shirlan® (Syngenta, Switzerland, active ingredient fluazinam). Further suitable antifungal compounds can be found in Gewasbeschermingsgids 2006, Gids voor gewasbescherming in de land-en tuinbouw en het openbaar en particulier groen, Plantenziektenkundige Dienst, 2006, 560 pages, Paperback, Gewasbeschermingsgids—ISSN 1571-201X, Volume 18.

A composition comprising a polyene antifungal agent suitable in the process of the invention may advantageously comprise at least one sticking agent, which improves the sticking of the antifungal compound to the roots of the plant. Examples of such sticking agents are latex based products like Prolong® (Holland Fyto B.V., The Netherlands) and Bond® (Loveland Industries Ltd), pilonene/terpene based products like Nu-film® (Hygrotech Saad) and Spray-Fast® (Mandops) and long chain polysaccharides like xanthan gum, gellan gum and guar gum. Alternatively, the sticking agent may be a polymer or co-polymer from a type of polymer such as polyacrylate and polyethylene e.g. Neocryl® (DSM, The Netherlands). The composition of the invention may also comprise two or more different sticking agents.

A composition comprising a polyene antifungal suitable in the process of the invention may advantageously comprise at least one surfactant. The optional addition of said compounds to such compositions is therefore also included in this invention. Examples of useful surfactants are anionic tensides such as sodium lauryl sulphate or polyethylene alkyl ethers or polyoxyethylethers, e.g. Tween® 60, 61 or 65. Other examples of useful surfactants are organo silicones, sulfosuccinates, alcohol ethoxylates, fatty acid ethoxylates, fatty acid propoxylates and the commercial product Zipper® (Asepta B.V., The Netherlands).

In an embodiment, the composition comprising a polyene antifungal agent suitable in the process of the invention comprises at least one additional compound selected from the group consisting of surfactants, sticking agents, carriers, adjuvants, solvents, dispersants, emulsifiers, wetting agents, stabilizers, antifoaming agents, buffering agents, and antioxidants.

Unexpectedly, the present inventors have found that applying a polyene antifungal agent to the roots of a fruit-bearing plant prior to planting said plant or to the medium to which the plant is to be planted increases the yield of the crop of that plant.

An increase in crop yield may comprise an increase in the number of crop, i.e. an increase in the number of melons, tomatoes, strawberries etc. at the time when the crop is ready to harvest. An increase in crop yield may comprise an increase in the weight of individual crop (e.g. the (average) weight of individual strawberry), for example an increase in the average weight of the total crop, such as the increase in the average weight of the total harvest of strawberries. An increase in crop yield may comprise an increase in the total weight of the (harvested) crop. An increase in crop yield may result in faster development (growth, weight gain) of the crop, such that the crop can be harvested earlier, saving precious time. A combination of these effects is also possible.

For all these treatments, processes and equipment well-known to a person skilled in the art can be used. A main advantage of the brush process, plaster-like compositions and spraying resins on the surface is that the fungicide is directly applied on the roots of the crop-bearing plant. On the other hand, aqueous dipping, drenching, or spraying applications using automatic systems reduce the labor costs and are more cost-effective.

The polyene antifungal agent is preferably applied to the roots of a crop-bearing plant prior to planting said plant and/or to the medium to which the plant is to be planted in an effective amount, that is, in an amount such that the yield of the crop is increased relative to a treatment in which the polyene antifungal agent is not applied to the roots of a crop-bearing plant prior to planting said plant and/or to the medium to which the plant is to be planted, under otherwise identical conditions.

In an embodiment, the polyene antifungal agent is applied to the roots by dipping the roots in a liquid composition comprising said polyene antifungal agent.

In another embodiment, the polyene antifungal agent is applied to the medium to which the plant is planted, typically soil, but synthetic growth substrate is also possible.

A combination of the two is also possible. Thus, the process also encompasses applying the polyene antifungal agent to the roots of the crop-bearing plant and to the medium to which the plant is to be planted.

The polyene antifungal agent can be applied to the roots of the crop-bearing plant by spraying, brushing, fogging, and other suitable processes. Preferred application is by dipping, drenching the roots, e.g. in a liquid composition comprising the polyene antifungal agent.

Applying the polyene antifungal agent to the roots of a crop-bearing plant can be done by holding the plant, either manually or by a dedicated machine by its stems and dipping the roots in the polyene antifungal agent which is preferably in the form of a liquid composition. For example, the plants can be lowered in a liquid composition comprising the polyene antifungal agent. Once the roots have been dipped in the polyene antifungal agent, the plant can be planted in the medium such as soil or synthetic substrate.

Application of the polyene antifungal agent to the medium to which the plant is planted can be done by sprinkling, dripping, fogging etc. This can be done prior to planting the plants, but can also be done after the plants have been planted.

The polyene antifungal agent can be applied in dry form, e.g. as powder, or as a liquid.

The polyene antifungal agent is preferably applied before harvesting the crop. However, the invention also includes applying the polyene antifungal agent to the medium to which the plant is to be planted after the crop has been harvested, and before a further harvest, i.e. in between harvests, or after part of the crop has been harvested.

After treatment with polyene antifungal agent the crop can be harvested and may be packed in plastic.

Treatment of the roots is done for a period sufficient to result in an increase of yield of crop. For example, such treatment may be done for 1 second up to 1 day, more preferably between 1 second and 1 hour, more preferably between 1 second and 2 minutes, even more preferably between 1 and 30 seconds. It is preferred to minimize the time of treatment for economic reasons. In an embodiment, baby plants are treated by the process of the invention.

In another embodiment, the polyene antifungal is applied to the roots of the strawberry plant in the absence of sunlight. It was surprisingly established that such method, i.e. application indoors or by any other means whereby prolonged contact to sunlight and/or UV light is avoided, resulted in a further and significantly higher reduction in disease incidence. Suitably the method is carried in indoor places such as a barn, a warehouse, a greenhouse, or any other building comprising a roof blocking direct sunlight from the plant during or after application of the polyene antifungal to the roots of the strawberry plant.

In a second aspect, the invention provides a crop-bearing plant of which the roots have been treated with a polyene antifungal agent. In an embodiment, the treated roots comprise from 0.01 to 20 mg/dm$^2$, preferably from 0.1 to 10 mg/dm$^2$, of a polyene antifungal agent on their surface. In another embodiment, the treated roots comprise from 0.1 ppm/kg to 10,000 ppm/kg of a polyene antifungal agent on their surface.

In one embodiment, the crop-bearing plant is a strawberry plant and said polyene antifungal agent is natamycin. For example, said strawberry plant is cv. Florida Radiance, cv. Portola or cv. Fronteras.

In a third aspect, the invention provides the use of natamycin to prevent or reduce anthracnose in a strawberry plant. In one embodiment, natamycin is applied to the roots of the strawberry plant and the strawberry plant is cv. Florida Radiance, cv. Portola or cv. Fronteras.

EXAMPLES

Example 1

Treatment of Cv. Portola Plants with Natamycin

Baby strawberry plants of cv. Portola were either inoculated or non-inoculated (naturally infected). Inoculation was done by dipping plants for 4 minutes in conidial suspensions of *Colletotrichum acutatum*, and then drip-dried. Plants were then stored for 8 h at 20° C., or 3 days at 5° C. Plants were then treated with natamycin by dipping them for 10 seconds in a liquid which was obtained either by adding 13.3 oz of a 10% w/v natamycin suspension to 150 gallon of water or which was obtained by adding 26.6 oz of a 10% w/v natamycin suspension to 150 gallon of water. The plants were then planted in different rows for each treatment, one feet apart and the yield was evaluated for fruit yield after 6 weeks. See below Table 1 for results.

TABLE 1

Treatment of cv. Portola plants with natamycin

|  |  | Yield per treated plot (kg/m$^2$) | Average weight per individual strawberry (g) |
|---|---|---|---|
| No water control |  | 585.1 | 7.9 |
| Water control |  | 406.4 | 7.3 |
| Natamycin | 13.3 oz./150 gallon | 714.4 | 8.7 |
| Natamycin | 26.6 oz./150 gallon | 742.5 | 8.7 |

Example 2

Treatment of cv. Portola and cv. Fronteras Plants with Various Antifungals

Rooted plugs of strawberry cv. Portola and cv. Fronteras plants obtained from two commercial nurseries were dipped for 4 min into conidial suspensions (10$^6$ conidia/ml) of azoxystrobin (QoI)-sensitive (S) or -resistant (R) strains of *Colletotrichum acutatum*. Plants were stored at 20° C. for 8 h to allow the pathogen to germinate and infect, and then up to 3 days at 5° C. until treatment. Naturally infected plants from one nursery were also used. Dip treatments for 4 min of inoculated and non-inoculated plants included water without (i.e., control) and with the following fungicides:

Actinovate, a commercially available biological antifungal preparation containing *Streptomyces lydicus* was applied at 24 oz./150 gal.

Azoxystrobin, a commercially available synthetic strobilurin fungicide was applied at 8 fl. oz./150 gal.

Bravo®, a synthetic fungicide comprising chlorothalonil available from Syngenta, was applied at 24 fl. oz./150 gal.

Switch®, a synthetic fungicide comprising cyprodinil and fludioxonil available from Syngenta, was applied at 8 oz./150 gal.

The amounts mentioned for natamycin are per 150 gal.

Plants were allowed to drip-dry and were stored overnight at 5° C. Plants were planted one foot apart in double-row beds in a randomized complete block design with each bed representing a single block (replication) and a total of four blocks. There were 10 plants each of cv. Portola and cv. Fronteras in each replication in the inoculated plant portion of the field, and there were 20 plants per replication for the non-inoculated cv. Portola plants. Overhead irrigation was applied daily for 30 min for the first week, and then twice a week for the remaining time (one month total), similar to commercial practices.

Re-Isolation and Treatment Evaluation:

Plants were evaluated periodically for disease and phytotoxicity over the course of the trial. As plants develop disease symptoms, fungal isolations were done from diseased tissue to validate the symptoms as anthracnose. For this, pieces of crown and leaf tissues from the margins between diseased and healthy tissue were surface-sterilized with sodium hypochlorite and rinsed with sterile, distilled water. A small sample of this plant tissue was removed, cut into pieces, and plated onto 10-cm potato dextrose agar media plates amended with ampicillin and rifampicin to inhibit bacterial growth. Plates were incubated for 5-6 days at 25° C., and fungal colonies were identified using morphological characteristics. A subset of fungal colonies was confirmed by PCR using species-specific primers for *Colletotrichum acutatum* (Förster and Adaskaveg, *Phytopathology* (1999) 89 1056-1065).

In Vitro Toxicity Assays:

Diseased plants were collected and isolates of *Colletotrichum acutatum* were obtained by culturing the pathogen onto PDA media as described above. The toxicity of natamycin to *Colletotrichum acutatum* was determined using the spiral gradient dilution assay. For this, an aqueous suspension of conidia was prepared and conidia for each isolate were spread in a radial pattern across a log-dilution of the fungicide on a 150 mm-PDA plate. Plates were incubated 3 to 4 days at 20° C. The growth response of the fungus was recorded and EC50 values determined based on the chemical concentration where 50% of the growth was inhibited.

Statistical Analysis of Data:

Categorical disease ratings were averaged to obtain a severity rating for each replication. Mean values for treatments (4 replications per treatment) provided an overall severity rating. Average percent mortality per replicate was determined and then arcsine-transformed. Yield data were summarized for each replicate and averaged for each treatment and log 10-transformed. Data were analyzed as a split plot for the QoI-S and -R inoculated plants and then by variety using a one-way ANOVA or a general linear model with treatment as the single factor. Multiple comparisons were conducted using Fisher's Least Significant Difference test. All statistical procedures were done using SAS version 9.4 with a significance value of $\alpha=0.05$. In vitro toxicity data were subjected to Scott's distribution analysis. Mean values and range of sensitivity were determined for the isolates collected. This information was used to develop the baseline sensitivity for natamycin to *Colletotrichum acutatum*. Plant growth evaluation was after four weeks, fruit yield evaluation after six weeks. For evaluation, plants were visually rated for disease severity based on their appearance using a scale from 0 (healthy, vigorous plant) to 4 (dead plant). Data were summarized based on average severity for each treatment and percent plant mortality. For determining crop yield, all marketable fruit were harvested separately from each treatment plot, counted, and weighed. Data were summarized based on average total weight per plot and on weight per fruit. For results see below Table 2 (plant growth) and Table 3 (yield and fruit size).

TABLE 2

Treatment of strawberry plants with various antifungals; effect on plant growth

| | Inoculated: Azoxystrobin-sensitive isolate (Nursery 1) | | | | Inoculated: Azoxystrobin-resistant isolate (Nursery 1) | | | | Naturally infected (Nursery 2) cv. Portola | | |
|---|---|---|---|---|---|---|---|---|---|---|---|
| | cv. Portola | | cv. Fronteras | | cv. Portola | | cv. Fronteras | | | | |
| | DS | DI (%) | DS | DI (%) | DS | DI (%) | DS | DI (%) | DS | DI (%) | LSI |
| No water control | 3.5 | 95.0 | 1.9 | 84.7 | 4.0 | 100.0 | 2.4 | 87.5 | 1.1 | 64.6 | 1.2 |
| Water control | 3.4 | 100.0 | 1.5 | 71.7 | 4.0 | 100.0 | 2.6 | 90.0 | 2.0 | 86.7 | 1.3 |
| Actinovate | 3.2 | 97.5 | 1.9 | 70.0 | 3.9 | 100.0 | 2.9 | 97.5 | 1.5 | 74.9 | 1.0 |
| Azoxystrobin | 0.8 | 33.1 | 0.2 | 7.5 | 4.0 | 100.0 | 2.9 | 100.0 | 0.5 | 41.7 | 0.5 |
| Bravo ® | 2.7 | 90.0 | 1.1 | 52.5 | 2.9 | 87.5 | 1.6 | 67.5 | 1.2 | 69.4 | 0.5 |
| Switch ® | 0.4 | 41.7 | 0.4 | 37.5 | 0.5 | 40.0 | 0.3 | 23.6 | 0.8 | 53.1 | 0.8 |
| Natamycin 13.3 oz. | 0.8 | 32.5 | 0.8 | 37.5 | 2.2 | 82.5 | 0.8 | 37.5 | 0.9 | 57.5 | 0.6 |
| Natamycin 26.6 oz. | 0.4 | 27.5 | 0.6 | 32.5 | 0.4 | 29.4 | 1.3 | 54.2 | 0.7 | 53.7 | 0.4 |

DS: Disease severity, by ranking (average): 4 (dead); 3 (severely stunted); 2 (poor growth); 1 (off color); 0 (no reduction, good plant)
DI: Disease incidence, in % (average)
LSI: Leaf spot incidence, in number of spots (average)

TABLE 3

Treatment of strawberry plants with various antifungals; effect on yield and fruit size

|  | Inoculated: Azoxystrobin-sensitive isolate (Nursery 1) | | | | Inoculated: Azoxystrobin-resistant isolate (Nursery 1) | | | | Naturally infected (Nursery 2) cv. Portola | |
|---|---|---|---|---|---|---|---|---|---|---|
|  | cv. Portola | | cv. Fronteras | | cv. Portola | | cv. Fronteras | | | |
|  | Y | W | Y | W | Y | W | Y | W | Y | W |
| No water control | 11.6 | 5.8 | 23.9 | 7.56 | 0.0 | 0.0 | 81.2 | 8.7 | 585.1 | 7.9 |
| Water control | 6.2 | 8.0 | 125.0 | 8.34 | 0.0 | 0.0 | 101.8 | 9.8 | 406.4 | 7.3 |
| Actinovate | 13.9 | 3.6 | 75.4 | 6.92 | 0.0 | 0.0 | 29.0 | 5.1 | 454.4 | 7.6 |
| Azoxystrobin | 157.7 | 6.4 | 378.1 | 10.68 | 0.0 | 0.0 | 16.4 | 7.9 | 1114.8 | 9.8 |
| Bravo ® | 21.2 | 4.8 | 102.4 | 8.74 | 23.7 | 8.7 | 116.7 | 8.6 | 689.6 | 9.1 |
| Switch ® | 151.9 | 6.6 | 190.2 | 8.33 | 149.7 | 5.8 | 254.9 | 10.0 | 792.2 | 9.3 |
| Natamycin 13.3 oz. | 224.1 | 7.9 | 161.8 | 8.14 | 112.4 | 7.9 | 261.7 | 8.9 | 714.4 | 8.7 |
| Natamycin 26.6 oz. | 188.4 | 7.0 | 161.1 | 8.31 | 235.0 | 8.6 | 145.2 | 9.3 | 742.5 | 8.7 |

Y: Yield (average), in g per treated plot
W: Weight (average), in g per fruit

Example 3

Evaluation of Dip Treatments on Florida Radiance Transplants with Various Antifungals for Control of *Colletotrichum acutatum*

Product effectiveness in managing root necrosis caused by *Colletotrichum acutatum* was evaluated by inoculating bare-root transplants of *Fragaria×ananassa* cv. Florida Radiance with a mixture of four *Colletotrichum acutatum* isolates, two sensitive and two resistant to Quinone-outside inhibitor (QoI) fungicides. Plants were inoculated by spraying a suspension of 106 conidia/ml onto plant roots using 300 ml per 100 plants. After inoculation, plants were kept at room temperature overnight and were transplanted into plastic-mulched raised beds. Beds were 28 in. wide on 4-ft. centers and contained two staggered rows of plants spaced 12 in apart within and 15 in. between rows. Fifteen treatments were arranged in a randomized complete block design with four blocks in neighboring beds. Plots were 10.5-ft. long with 20 plants each, separated by a 3-ft. gap without plants. Treatments consisted of submerging (dipping) four bundles of 20 plants each in a 4 gal. solution or suspension of fungicide for 5 min. All treatments were dipped in the field just prior to planting in single marked plots in each replication, except one treatment of natamycin which was dipped indoors to avoid degradation by sunlight. Controls were dipped in water for 5 min before planting. To aid establishment, plants were overhead irrigated for 10 days. Further irrigation and fertilization were done via drip tapes until the end of the evaluations. K-phite®, Prophyt®, Prophyt®+Abound®, and Phostrol® treatments received an additional foliar spray application 21 days after planting (DAP). Plant diameters of 10 staggered plants in each plot were measured 35 DAP using a ruler attached to a clear plastic sheet to push leaves down near the bed. Two perpendicular measurements were made, the first along the longest axis of the canopy. The 10% trimmed average was used to avoid outliers and estimate plant diameter per plot. Percentage of diseased plants (dead+wilted) was evaluated 42 DAP. Seven harvests were performed. Yield was determined by counting and weighing marketable fruit, and expressed in lb/A. Plant diameter, plant mortality, and yield were analyzed by fitting a generalized linear mixed model in SAS. Means were separated by Fisher's Protected LSD test ($\alpha$=0.05). For results see Table 4.

TABLE 4

Treatment of strawberry plants with various antifungals against *Colletotrichum acutatum*

| Treatment (rates/100 gal.) | Plant diameter (in)[1] | Disease incidence (%)[1] | Yield (lb./A)[1] |
|---|---|---|---|
| Switch ® (cyprodinil and fludioxonil), 8 oz. | 6.8 a | 1.2 e | 3887 a |
| Topsin ® (thiophanate-methyl), 20 fl. oz. | 6.5 ab | 1.2 de | 3202 ab |
| Natamycin, 26.6 fl. oz. (dipped in the field) | 5.7 bcd | 2.5 de | 2924 abc |
| Captan Gold ® (N-trichloromethylthio-4-cyclohexene-1,2-dicarboximide), 2 qt. | 6.5 ab | 5.0 cde | 2705 bcd |
| Natamycin, 26.6 fl. oz. (dipped indoors to avoid sunlight) | 5.9 abc | 0.0 e | 2547 bcde |
| Omega ® (fluazinam), 1.25 pt. | 4.6 cde | 17.5 abc | 2186 bcde |
| Kphite ® (mono- and di-potassium salts of phosphorous acid), 2 pt. dip f.b. 4 pt. spray, 21 DAP | 5.1 bcd | 12.5 abcd | 2145 bcde |
| ProPhyt ® (potassium phosphite), 4 pt. dip f.b. 4 pt. spray, 21 DAP | 4.4 de | 11.2 bcde | 2031 cde |
| ProPhyt ® (potassium phosphite), 2 pt. dip f.b. 4 pt. spray, 21 DAP | 4.3 de | 18.7 ab | 1897 cde |
| ProPhyt ® (potassium phosphite), 2 pt. + Abound ® (azoxystrobin), 8 fl. oz. dip f.b. ProPhyt ®, 2 pt. + Abound ®, 8 fl. oz. spray 21 DAP | 4.2 de | 16.2 ab | 1891 cde |

TABLE 4-continued

Treatment of strawberry plants with various antifungals against *Colletotrichum acutatum*

| Treatment (rates/100 gal.) | Plant diameter (in)[1] | Disease incidence (%)[1] | Yield (lb./A)[1] |
|---|---|---|---|
| Phostrol ® (phosphorous acid salts), 2 pt. dip f.b. 4 pt. spray, 21 DAP | 5.0 cd | 13.7 abc | 1802 de |
| Abound ® (azoxystrobin), 8 fl. oz. | 4.5 de | 13.7 abc | 1644 de |
| Actinovate (*Streptomyces lydicus*), 24 oz. | 4.4 de | 13.7 abcd | 1516 e |
| Actinovate (*Streptomyces lydicus*), 12 oz. | 3.5 e | 28.7 a | 1488 e |
| Non-treated control | 4.2 de | 16.2 abc | 1690 de |

[1] Means in a column followed by the same letter are not significantly different by Fisher's Protected Least Significant Difference test ($\alpha = 0.05$)

Diseased plants ranged from 0.0 (natamycin 26.6 fl. oz. indoor treatment) to 28.7% (Actinovate 12 oz.), demonstrating the remarkable positive effect when natamycin treatment was carried out in the absence of direct sunlight. Switch®, Topsin®, and both rates of natamycin were the only treatments that reduced disease incidence compared to the non-treated control. With the exception of natamycin (dipped in the field), these same treatments as well as Captan Gold® significantly increased plant diameter when evaluated 35 DAP. Switch®, Topsin®, and natamycin (dipped in the field), were the only treatments producing higher yields than the non-treated control. The only QoI fungicide tested (Abound®) did not differ from the non-treated control for any of the evaluated parameters suggesting that this group of fungicides is no longer effective when resistant isolates are present.

The invention claimed is:

1. A process for increasing the yield of a strawberry crop, the process comprising applying natamycin to the roots of a strawberry plant prior to planting said strawberry plant, wherein said strawberry plant is infected with, or susceptible to infection with *Colletotrichum* spp, and wherein the yield is increased compared to strawberry plants infected with, or susceptible to infection with *Colletotrichum* spp., to which natamycin was not applied.

2. The process according to claim 1, wherein the natamycin is part of a liquid composition.

3. The process according to claim 1 comprising at least one additional compound selected from the group consisting of surfactants, sticking agents, carriers, adjuvants, solvents, dispersants, emulsifiers, wetting agents, stabilizers, antifoaming agents, buffering agents, and antioxidants.

4. The process according to claim 2 wherein the concentration of the natamycin in the liquid composition is from 1-10,000 ppm.

5. The process according to claim 1 wherein the natamycin comprises needle shaped crystals having an average length of between 0.1 and 20 µm.

6. The process according to claim 5 wherein the natamycin comprises at least 90% w/w needle shaped crystals having an average length of between 0.1 and 20 µm.

7. The process according to claim 1 wherein said natamycin is applied to the roots of said strawberry plant in the absence of sunlight.

8. The method of claim 1, wherein the *Colletotrichum* spp. is *Colletotrichum acutatum*.

* * * * *